(12) United States Patent
Lee

(10) Patent No.: US 12,211,026 B2
(45) Date of Patent: Jan. 28, 2025

(54) PRODUCT CHECKOUT SYSTEM USING AUTOMATIC BARCODE SCANNING

(71) Applicant: Hyun Lee, Chuncheon-si (KR)

(72) Inventor: Hyun Lee, Chuncheon-si (KR)

( * ) Notice: Subject to any disclaimer, the term of this patent is extended or adjusted under 35 U.S.C. 154(b) by 207 days.

(21) Appl. No.: 17/751,876

(22) Filed: May 24, 2022

(65) Prior Publication Data

US 2023/0100897 A1 Mar. 30, 2023

(30) Foreign Application Priority Data

Sep. 28, 2021 (KR) ........................ 10-2021-0127679

(51) Int. Cl.
*G06Q 20/20* (2012.01)
*G06K 7/10* (2006.01)
*G06K 7/14* (2006.01)

(52) U.S. Cl.
CPC ....... *G06Q 20/208* (2013.01); *G06K 7/10722* (2013.01); *G06K 7/1413* (2013.01)

(58) Field of Classification Search
CPC ............ G06Q 20/208; G06K 7/10722; G06K 7/1413; G07G 1/0045
See application file for complete search history.

(56) References Cited

U.S. PATENT DOCUMENTS

| | | | | |
|---|---|---|---|---|
| 9,227,323 B1 * | 1/2016 | Konolige | ................. | H04N 5/33 |
| 2018/0046963 A1 * | 2/2018 | Kobayashi | ............. | G06Q 10/06 |
| 2020/0017317 A1 * | 1/2020 | Yap | ........................ | G06Q 10/08 |
| 2022/0348409 A1 * | 11/2022 | Sun | ......................... | B07C 5/362 |
| 2024/0033907 A1 * | 2/2024 | Rudy | ..................... | B25J 9/1697 |
| 2024/0075619 A1 * | 3/2024 | Diankov | ................ | B25J 9/1697 |

FOREIGN PATENT DOCUMENTS

| | | | |
|---|---|---|---|
| JP | 2019185564 A | * | 10/2019 |
| KR | 10-2018-0107391 A | | 10/2018 |
| KR | 10-2018-0109107 A | | 10/2018 |
| KR | 101927132 B1 | * | 12/2018 |

OTHER PUBLICATIONS

Klingbeil et al. (âGrasping with Application to an Autonomous Checkout Robotâ, May 9-13, 2011) (Year: 2011).*
Klingbeil et al. ("Grasping with Application to an Autonomous Checkout Robot", May 9-13, 2011) (Year: 2011).*

* cited by examiner

*Primary Examiner* — Florian M Zeender
*Assistant Examiner* — Vanessa Deligi
(74) *Attorney, Agent, or Firm* — KORUS Patent, LLC; Seong Il Jeong

(57) ABSTRACT

A product checkout system using automatic barcode scanning according to the present invention may comprise: an imaging unit photographing a product and generating a product image; a processor recognizing a barcode position of a barcode that is provided on one side of the product and contains price information of the product, based on the product image, and a robot arm unit grasping and moving the product to a barcode scanning device so that the barcode is scanned.

1 Claim, 6 Drawing Sheets

PRODUCT CHECKOUT SYSTEM USING AUTOMATIC BARCODE SCANNING

FIELD OF THE INVENTION

The present invention relates to a product checkout system using automatic barcode scanning, and more particularly, to a product checkout system using automatic barcode scanning capable of completing a transaction with automatic barcode scanning by sensing a barcode position of the product, grasping the product with a robot arm unit, and moving the product to the barcode scanning device.

BACKGROUND OF THE INVENTION

In general, a robot is a machine that automatically processes or operates a given task with its own ability. Application fields of a robot are usually classified into various fields such as industrial, medical, space, and seabed. Recently, communication robots that can perform communication or interaction with humans through voice and gestures are increasing.

In addition, there have been attempts to reduce labor and increase accuracy of a logistic process by automating the entire logistic process such as product production, shipment, transportation, unloading, packaging, storage, and product checkout. Automating a logistic process has effects of reducing costs and preventing safety accidents according to reduction of labor.

In particular, when products are purchased in a store, since a store employee performs scanning a barcode for each product through a barcode scanning device to check out the products, malicious customers' waiting time increases due to an increase in time required for the product checkout. Accordingly, congestion in the store also increases due to the increased time for the product checkout, and store management expenses also increase due to employment for the product checkout.

Accordingly, it is required to develop a technology that can quickly and accurately check out products that a customer wants to purchase, in an unmanned manner.

PRIOR ART DOCUMENTS

Patent Documents (Patent Document 1) Korean Patent Publication No. 10-2018-0109107.

DETAILED DESCRIPTION OF THE INVENTION

Technical Problems

An object of the present invention is to provide a product checkout system using automatic barcode scanning that performs product checkout by scanning a barcode of a product that a customer wants to purchase quickly and accurately in an unmanned manner.

Objects of the present invention are not limited to the object mentioned above, and other objects and advantages of the present invention may be understood by following descriptions and will be more clearly understood by embodiments. In addition, objects and advantages of the present invention can be realized by means specified in the appended claim and a combination thereof.

SUMMARY OF THE INVENTION

A product checkout system using automatic barcode scanning according to the present invention may comprise: an imaging unit photographing a product and generating a product image; a processor recognizing a barcode position of a barcode that is provided on one side of the product and contains price information of the product, based on the product image, and a robot arm unit grasping and moving the product to a barcode scanning device so that the barcode is scanned.

Preferably, the processor may set the barcode position sensed based on the product image as a barcode area and set a first grasped area which can be grasped by the robot arm unit so that the product is moved to the barcode scanning device, based on the product image.

Preferably, the processor may set the barcode area and the first grasped area so that the barcode area and the first grasped area are not overlapped with each other.

Preferably, the robot arm unit may grasp a portion of the product corresponding to the first grasped area and move the product to the barcode scanning device.

Preferably, if the barcode position is not sensed, the processor may set a second grasped area which can be grasped by the robot arm unit in order to change an arrangement state of the product so that the barcode is exposed to the outside.

Preferably, the robot arm unit may grasp a portion of the product corresponding to the second grasped area and change the arrangement state of the product.

Preferably, the robot arm unit may move the product so that a portion of the product corresponding to the barcode area of the barcode position faces the barcode scanning device.

Preferably, the processor calculates a fee for performing checkout of the product by scanning the barcode of the product based on one or more of product checkout difficulty information corresponding to the product.

TECHNICAL EFFECTS OF THE INVENTION

The product price checkout system using automatic barcode scanning according to the present invention can reduce labor and personnel expenses by performing a product checkout process which requires a lot of labor and personnel expenses through a robot using artificial intelligence.

MODES FOR THE INVENTION

Figure 1:
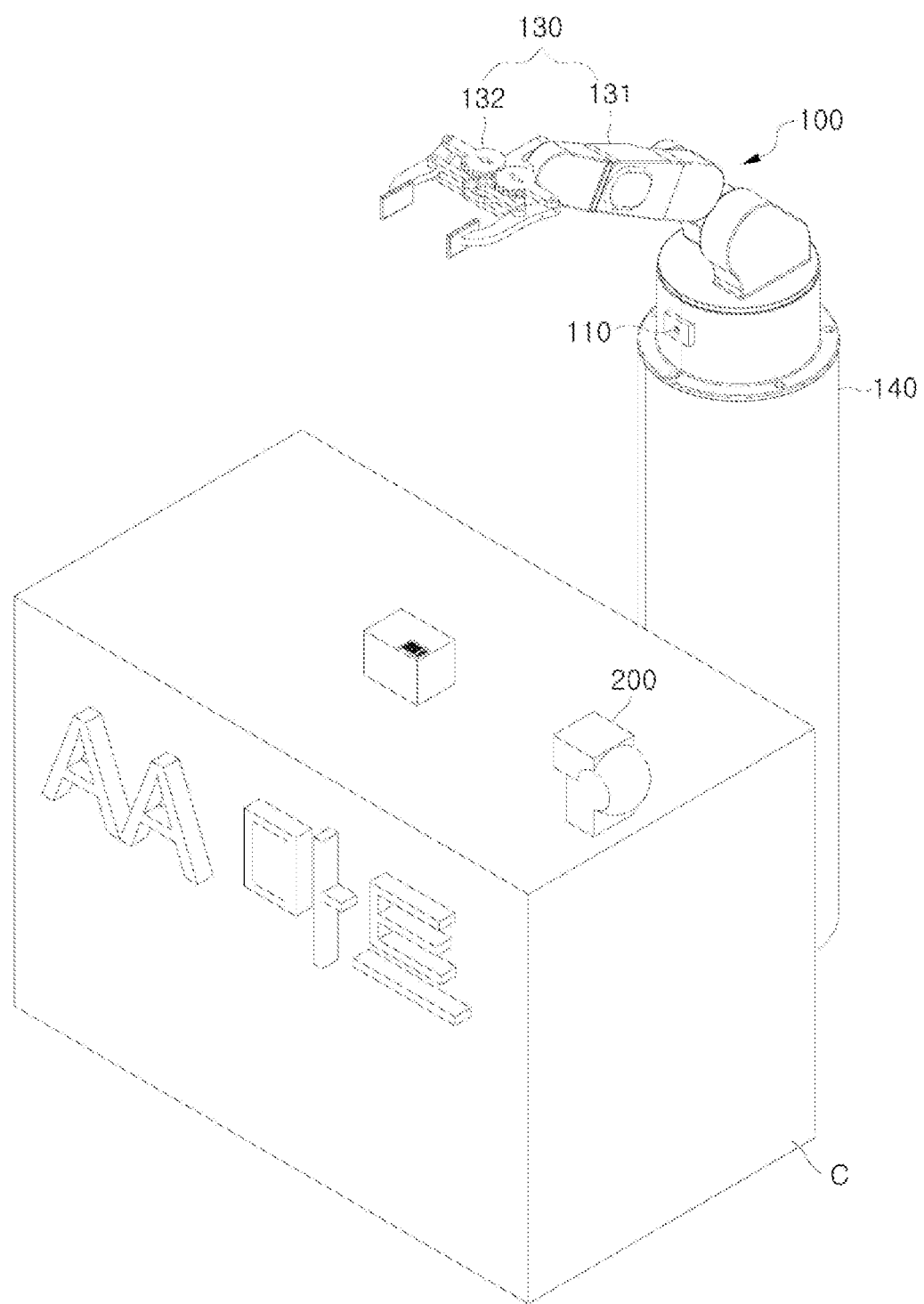
FIG. 1 is a drawing illustrating a product checkout system using automatic barcode scanning, a barcode scanning device, a product, and a counter C according to an embodiment of the present invention.

Hereinafter, various embodiments of the present invention are described with reference to the accompanying drawings. However, the present invention is not limited to the specific embodiments, and it should be understood to include various modifications, equivalents, and/or alternatives of the embodiments of the present invention. Regarding description of drawings, like reference numbers may be used for like components.

In this document, expressions such as "have", "may have", "include", "may include", "comprise", or "may comprise" indicate presence of corresponding features (e.g., a numerical value, a function, an operation, or a component such as a part), and it does not exclude presence of additional features.

In this document, expressions such as "A or B", "at least one of A or/and B", or "one or more of A or/and B" may include all possible combinations of the listed items. For example, "A or B", "at least one of A and B", or "at least one of A or B" may indicate either cases of (1) including at least one A, (2) including at least one B, or (3) including at least one A and at least one B.

Expressions such as "first" or "second" used in this document can modify various components regardless of an order and/or importance. They are used to distinguish one component from the other components but does not limit the component. For example, a first user device and a second user device may indicate different user devices regardless of an order or importance. For example, a first component may be named as a second component without departing from scopes of claims described herein, and similarly, a second component may be named as a first component.

When it is mentioned that a component (e.g., a first component) is "(operatively or communicatively) coupled with/to" or "connected to" another component (e.g., a second component), it should be understood that the component is coupled with/to or connected to the another component directly or through another component (e.g., a third component). On the other hand, when it is mentioned that a component (e.g., a first component) is "directly coupled with/to" or "directly connected to" another component (e.g., a second component), it can be understood that there is no other component (e.g., a third component) between the component and the another component.

The expression "configured to or set to" used in this document can be substituted by other expressions such as "suitable for", "having the capacity to", "designed to", "adapted to", "made to", or "capable of" according to situations. The term "configured to or set to" may not necessarily mean "specifically designed to" in hardware. Instead, in some situations, the expression "device configured to do something" may mean that the device "can do something" along with a different device or a part. For example, "a control unit configured or set to perform A, B, and C" may mean a dedicated processor for those operations (e.g., an embedded processor) or a generic purpose processor (e.g., CPU or an application process) capable of performing those operations by executing one or more software programs stored in a memory.

In particular, in this specification, a "device" may include one or more of a central processing unit CPU, an application processor AP, or a communication processor CP.

In this specification, a "device" may mean all kinds of hardware devices that include at least one processor. In addition, depending on embodiments, it can be understood that software configuration that is operated on the hardware device may also be included in the "device" in a comprehensive meaning. For example, it may be understood that a "device" may mean to include a machine operating device, a smartphone, a tablet PC, a desktop, a laptop, and user clients and applications operated in each device but are not limited thereto.

Terms used in this document are used to explain particular embodiments and may not be intended to limit scopes of other embodiments. Singular expressions may include plural expressions unless otherwise clearly stated in the context. Terms used herein, including technical or scientific terms, may have the same meaning as they are generally understood by those who have general knowledge in the technical field described herein. Terms defined in a usual dictionary among terms used in this document may be construed as the same or similar meaning in the context of the relevant technology and is not construed in an ideal or excessively formal meaning, unless clearly defined in this document. In some cases, even terms defined in this document should not be construed to exclude embodiments of this document.

Figure 2:
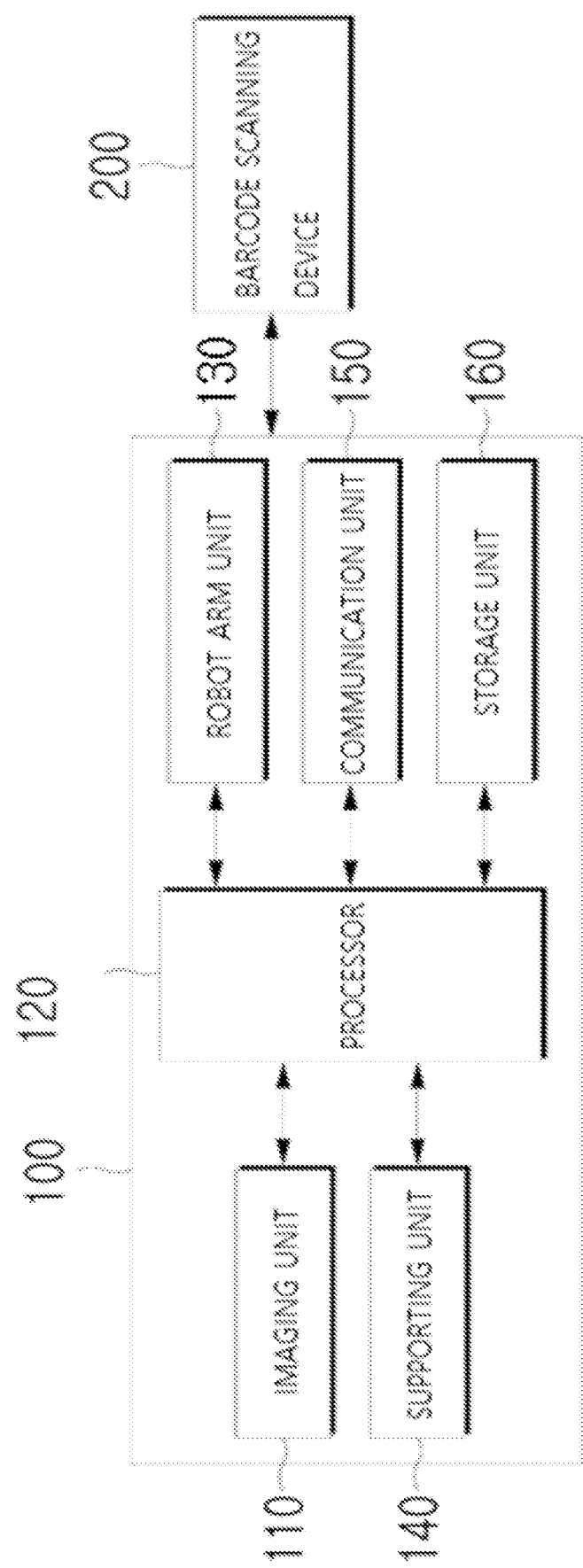
FIG. 2 is a configuration block diagram of the product checkout system using automatic barcode scanning according to an embodiment of the present invention.

FIG. 1 is a drawing illustrating a product checkout system using automatic barcode scanning, a barcode scanning device, a product, and a counter C according to an embodiment of the present invention. FIG. 2 is a configuration block diagram of the product checkout system using automatic barcode scanning according to an embodiment of the present invention.

Referring to FIGS. 1 and 2, the product checkout system 100 using automatic barcode scanning according to an embodiment of the present invention is located on one side of a counter C in a store. When products that a customer wants to purchase are put in the counter C, the product checkout system 100 may move and rotate the products so that a barcode provided at one side of the product is scanned by a barcode scanning device 200.

In this case, the barcode scanning device 200 is located on an upper portion of the counter C or the other side of the counter C and can obtain price information of the product by scanning the barcode of the product.

For scanning, the barcode scanning device 200 may use at least one of a visible light barcode scanning method that scans a barcode by receiving visible light reflected from the barcode, and a red light barcode scanning method that scans a barcode by receiving red light reflected from the barcode. However, it should be noted that a scanning method is not limited thereto as long as product price information can be obtained from the barcode.

Meanwhile, the barcode may be printed on one side of the product or printed on a tag made of a plastic material to be provided on one side of the product, and the price information of the product may be encoded and displayed. At this time, the barcode may be formed in any one method of Code 11, Code 39, Code 93, Code 128, UPC, EAN 8, EAN 13, PDF 417, and data matrix. It should be noted that the code method is not limited thereto as long as the price information is included.

In the process of moving and rotating the product so that the barcode provided on one side of the product is scanned by the barcode scanning device 200, the product checkout system 100 using automatic barcode scanning according to an embodiment of the present invention may grasp the other side of the product so that the barcode is exposed to the outside as much as possible.

For this configuration, the product checkout system 100 using automatic barcode scanning according to an embodiment of the present invention may include an imaging unit 110, a processor 120, and a robot arm unit 130.

The imaging unit 110 may generate a product image by photographing the product arranged on the counter C by the customer for product checkout. For generating the product image, the imaging unit 110 may include a camera module that generates the image. In addition, the imaging unit 110 may include a vision sensing camera module that performs vision sensing on the product.

Figure 3:
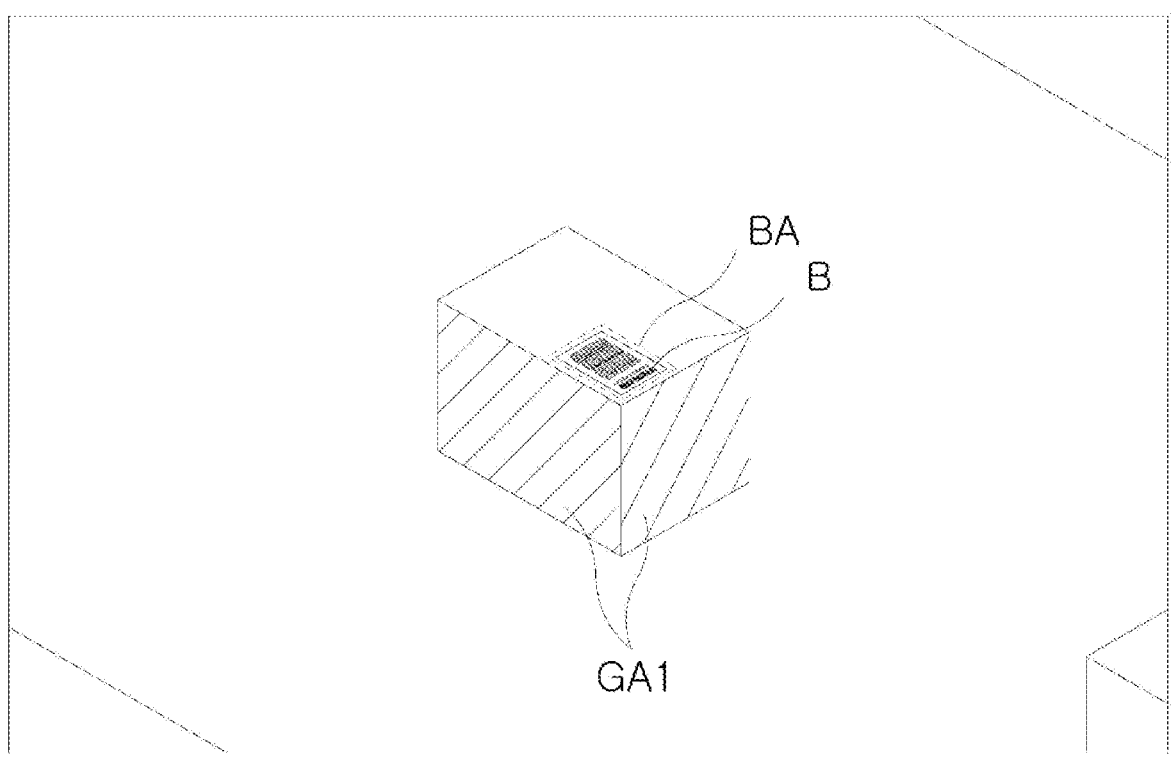
FIG. 3 is a drawing for explaining a process in which the product checkout system using automatic barcode scanning sets a barcode area and a first grasped area according to an embodiment of the present invention.

FIG. 3 is a drawing for explaining a process in which the product checkout system using automatic barcode scanning sets a barcode area and a first grasped area according to an embodiment of the present invention.

Referring further to FIG. 3, the processor 120 may recognize a barcode position of a barcode B provided on one side of the product and including price information of the product, based on the product image.

In this case, the processor 120 may recognize the barcode position using an artificial intelligence model. Specifically, the processor 120 may train the artificial intelligence model by using various product images taken in the past and the barcode positions recognized from the product images as learning data, input the product image of a product currently arranged on the counter C in the artificial intelligence model as input data, and output the barcode position mentioned above as output data.

In this case, a trained artificial neural network may be referred to as an artificial intelligence model, and the artificial intelligence model may be used to infer a result value with respect to new input data, which is not included in the learning data. The inferred result value can be used as a basis for determination to perform a certain operation.

In this case, artificial intelligence refers to a field that studies artificial intelligence or methodologies that can produce artificial intelligence, and machine learning refers to a field that defines various problems dealt with in the field of artificial intelligence and studies methodologies to solve those problems. Machine learning is also defined as an algorithm that improves performance of a certain task through continuous experience.

An artificial neural network ANN is a model used in machine learning and may refer to an overall model having a problem solving ability, which is composed of artificial neurons(nodes) that form a network with combined synapses. The artificial neural network may be defined by a connection pattern between neurons of different layers, a learning process that updates model parameters, and an activation function that generates an output value.

The artificial neural network may include an input layer, an output layer, and optionally one or more hidden layers. Each layer includes one or more neurons, and the artificial neural network may include neurons and synapses connecting between the neurons. In the artificial neural network, each neuron may output a function value of the activation function with respect to input signals input through the synapses, a weight, and a bias.

Model parameters refer to parameters determined through learning and include the weight of synaptic connections and the bias of neurons. In addition, hyperparameters refer to parameters that must be set before learning in a machine learning algorithm and include a learning rate, the number of iterations, a mini batch size, an initialization function, and the like.

The purpose of learning of artificial neural network may be to determine model parameters that minimize a loss function. The loss function may be used as an index for determining optimal model parameters in the learning process of the artificial neural network.

Machine learning may be classified into supervised learning, unsupervised learning, and reinforcement learning according to learning methods.

Supervised learning refers to a method of training an artificial neural network in a state in which a label for learning data is given, and the label may refer to a correct answer (or a result value) that the artificial neural network must infer when learning data is input to the artificial neural network. Unsupervised learning may refer to a method of training an artificial neural network in a state where no label is given for learning data. Reinforcement learning may refer to a method of training an artificial neural network in which an agent defined in an environment selects an action or sequence of actions that maximizes a cumulative reward in each state.

Among artificial neural networks, machine learning embodied as a deep neural network DNN including a plurality of hidden layers is also called deep learning, and deep learning is a part of machine learning. In this specification, the term "machine learning" is used to include deep learning.

Meanwhile, the barcode position may be a three dimensional area on a three dimensional coordinate space in which the counter C is a X-Y plane and a height from the counter C is a Z-axis.

Thereafter, the processor 120 may set the sensed barcode position as a barcode area BA based on the product image. That is, the processor 120 may set the 3D area, which is recognized as the barcode position, as the barcode area BA. The processor 120 may set the barcode area BA to be an area that is closest to a barcode scanning device 200 compared to the other areas of the product and that is not covered by the robot arm unit 130 and not blocked from the outside.

That is, the barcode area BA may be an area that the barcode B of the product is located in, that is closest to the barcode scanning device 200 later, and that is not grasped by the robot arm unit 130.

Meanwhile, the processor 120 may set a first grasped area GA1, which may be grasped by the robot arm unit 130 so that the product is moved to the barcode scanning device 200, based on the product image.

For setting the first grasped area GA1, the processor 120 may recognize a shape of the product based on the product image and set an area of the product that can be structurally grasped by the robot arm unit 130 as a graspable area.

Then, the processor 120 may remove the barcode area BA described above from the graspable area and set the rest of the graspable area as the first grasped area GA1.

That is, after setting the area of the product that can be grasped by the robot arm unit 130 as the graspable area based on a structure of the robot arm unit 130 and the shape of the product, the processor 120 removes the barcode area BA from the graspable area, and accordingly, the first grasped area GA1 is set.

In other words, the processor 120 sets the barcode area BA and the first grasped area GA1 so that the barcode area BA and the first grasped area GA1 are not overlapped with each other.

Through this, when the robot arm unit 130 grasps a portion of the product corresponding to the first grasped area GA1, since the robot arm unit 130 can grasp the product without blocking the barcode B, the robot arm unit 130 can allow the barcode B to be scanned by the barcode scanning device 200 by moving and rotating the product.

Figure 4:
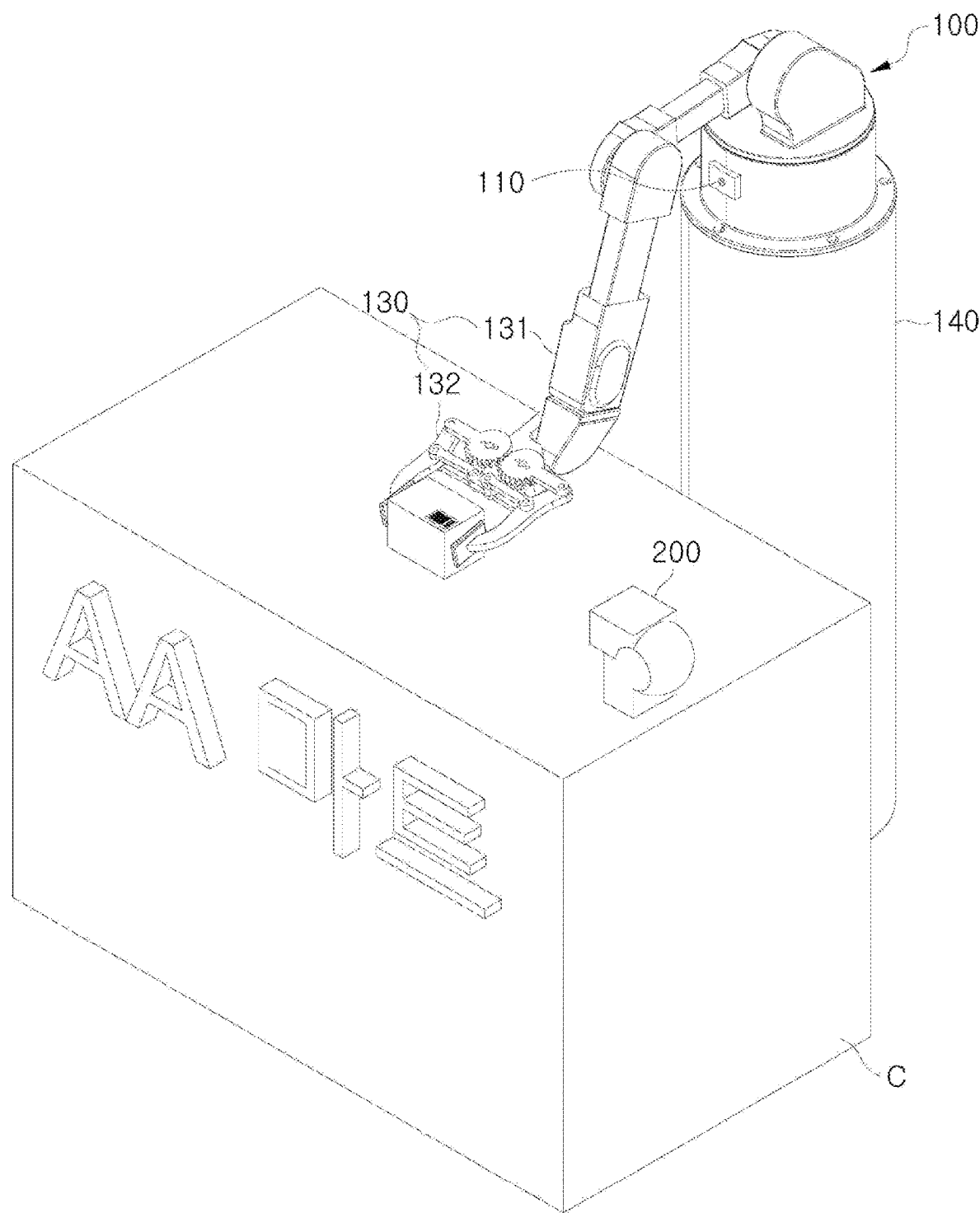
FIG. 4 is a drawing for explaining a process in which the product checkout system using automatic barcode scanning grasps the product to scan a barcode according to an embodiment of the present invention.
Figure 5:
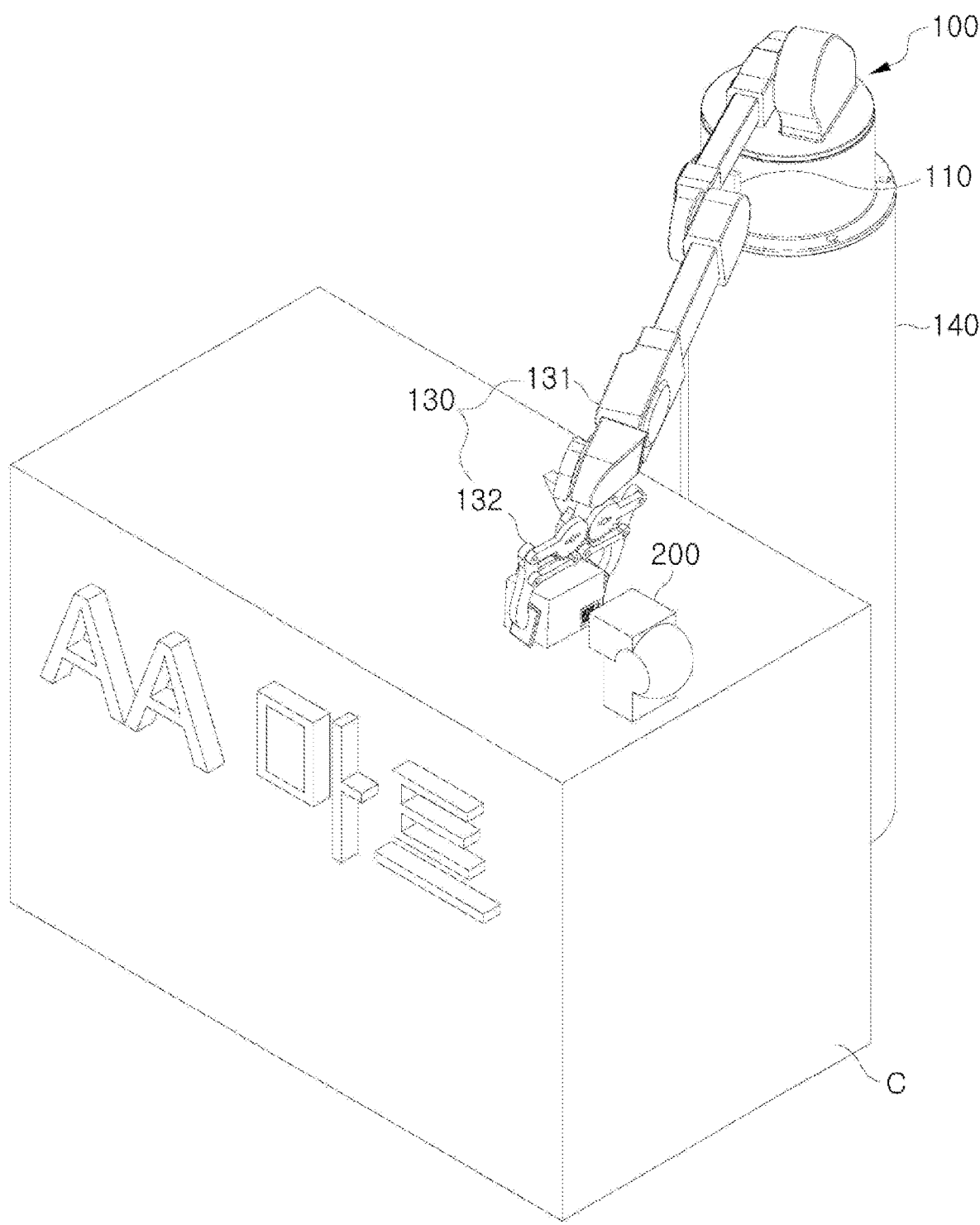
FIG. 5 is a drawing for explaining a process in which the product checkout system using automatic barcode scanning moves the product grasped for scanning the barcode according to an embodiment of the present invention.

FIG. 4 is a drawing for explaining a process in which the product checkout system using automatic barcode scanning grasps the product to scan a barcode according to an embodiment of the present invention. FIG. 5 is a drawing for explaining a process in which the product checkout system using automatic barcode scanning moves the product grasped for scanning the barcode according to an embodiment of the present invention.

Referring further to FIGS. 4 and 5, the robot arm unit 130 may grasp the product and move the product to the barcode scanning device 200 so that the barcode B of the product is scanned.

Specifically, operations of the robot arm unit 130 is controlled based on a control signal received from the processor 120 and may include a robot arm 131 one end of which is fixed to a supporting unit 140 and a grasping unit 132 connected to the other end of the robot arm 131.

At this time, the supporting unit 140 may be fixed to the ground adjacent to the counter C at a lower end thereof, and an upper end thereof may be connected to one end of the robot arm 131 to support the robot arm 131.

In addition, the grasping unit 132 may be configured to be formed in a tong shape and can grasp the product by pressing both sides of the product.

The robot arm unit 130 may control operation of the robot arm 131 and the grasping unit 132 according to the control signal of the processor 120.

Specifically, the robot arm unit 130 can grasp a portion of the product corresponding to the first grasped area GA1 through the robot arm 131 and the grasping unit 132 and move the product to the barcode scanning device 200.

Then, the robot arm unit 130 may move and rotate the product so that the barcode of the barcode area BA faces the barcode scanning device 200.

Through this, even if a store employee neither manually moves the barcode of the product to the barcode scanning device 200 nor scans the barcode, once a customer places the product on the counter C, the robot arm unit 130 grasps the product in a way that it does not cover the barcode and scans the barcode, and accordingly, the product checkout can be completed quickly without human labor.

For this operation, the robot arm unit 130 may be configured to embody mechanical movements. Specifically, the robot arm unit 130 may have one or more joints, links, and gears that can perform various tasks. The robot arm unit 130 may include a plurality of joints, a plurality of links connected to each other through the plurality of joints, and a driving motor rotating the plurality of joints. In this case, the processor 120 can control operation of the driving motor to control the robot arm unit 130, and accordingly, the robot arm unit 130 can control the robot arm 131 and the grasping unit 132.

Meanwhile, the product checkout system 100 using automatic barcode scanning according to an embodiment of the present invention may further comprise a communication unit 150 transmitting and receiving data, information, and signals and a storage unit 160 storing the data, the information, and the signal to perform the functions mentioned above.

Meanwhile, the processor 120 may perform operation of each component described above and include one or more cores (not shown), graphic processing units (not shown), and/or connection passages (e.g., bus, and the like) transmitting and receiving signals with other components.

The processor 120 may be configured to perform operation of each component described above by executing one or more instructions stored in the storage unit 180.

The storage unit 160 may store programs (one or more instructions) for processing and controlling the processor 120. The programs stored in the storage unit 160 may be divided into plurality of modules depending on functions.

Figure 6:
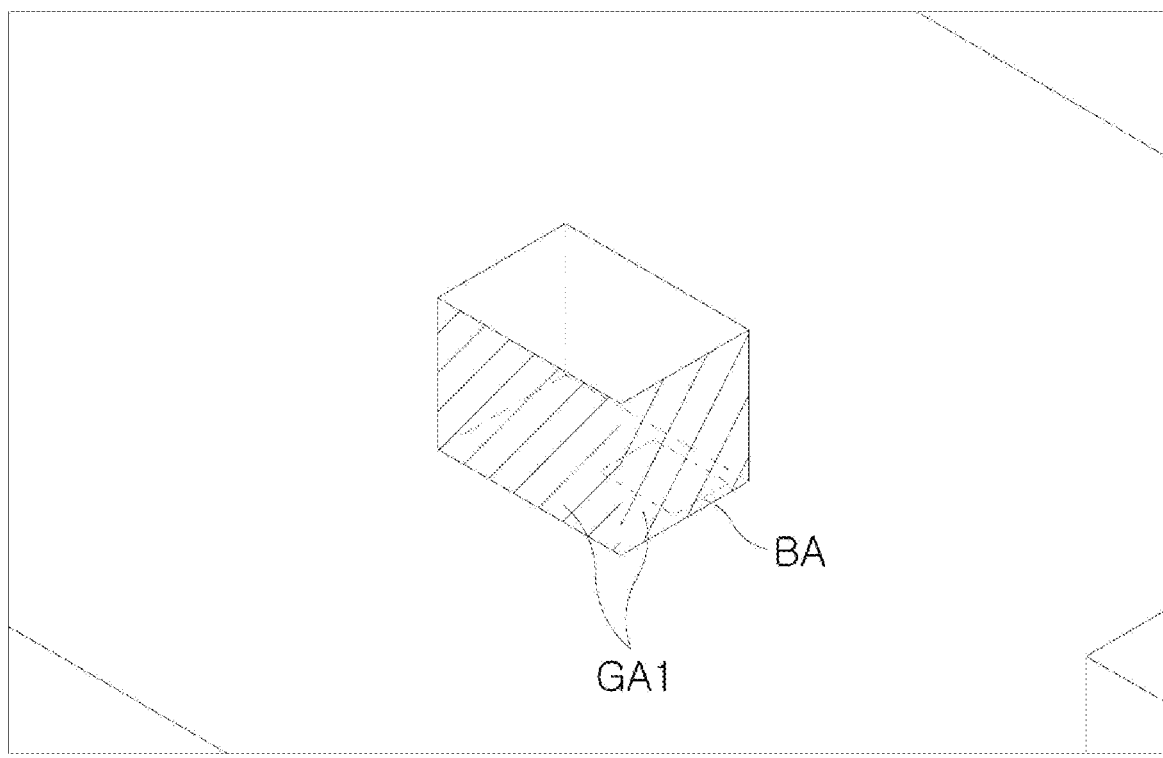
FIG. 6 is a drawing for explaining a process in which the product checkout system using automatic barcode scanning sets a second grasped area according to an embodiment of the present invention.
Figure 7:
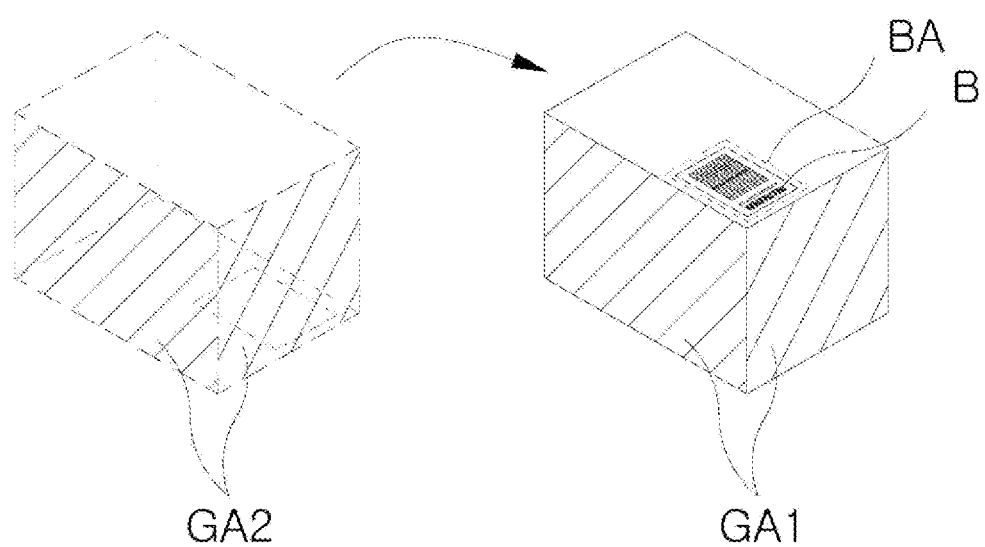
FIG. 7 is a drawing for explaining a process in which the product checkout system using automatic barcode scanning moves and rotates the product so that the barcode is exposed to the outside according to an embodiment of the present invention.

FIG. 6 is a drawing for explaining a process in which the product checkout system using automatic barcode scanning sets a second grasped area according to an embodiment of the present invention. FIG. 7 is a drawing for explaining a process in which the product checkout system using automatic barcode scanning moves and rotates the product so that the barcode is exposed to the outside according to an embodiment of the present invention.

Referring to FIGS. 6 and 7, if the barcode position is not sensed from the product disposed on the counter C, the processor 120 may set a second grasped area GA2 that can be grasped by the robot arm unit 130 based on the product image in order to change an arrangement state of the product so that the barcode is exposed to the outside.

As shown in FIG. 6, when a customer places the product on the counter C, if the barcode B is placed to face and be in contact with a top surface of the checkout C, the barcode B is not exposed to the outside, and the barcode position of the barcode may not be sensed.

In this case, the processor 120 can recognize the shape of the product based on the product image of the product that is arranged in a way that the barcode position cannot be sensed and then can set an area of the product that can be structurally grasped by the robot arm unit 130 as the second grasped area GA2.

Thereafter, the robot arm unit 130 may change the arrangement state of the product so that the barcode is exposed to the outside by grasping a portion of the product corresponding to the second grasped area GA2.

When the barcode position of the product is arranged to be able to be sensed, the processor 130 may re-set the first grasped area GA1 described above and may control the robot arm unit 130 so that a portion of the product corresponding to the first grasped area GA1 is grasped by the robot arm unit 130, and the product is moved to the barcode scanning device 200.

Meanwhile, the processor 120 of the product checkout system 100 using automatic barcode scanning according to another embodiment of the present invention may calculate a fee for performing checkout of the product price by scanning the barcode of the product based on product checkout difficulty information corresponding to the product.

First of all, the processor 120 may calculate the product checkout difficulty information based on a checkout time required to set the first grasped area GA1 for the product image of the product disposed on the counter C.

Specifically, in the case of setting the first grasped area GA1 for a product that is difficult to grasp, such as a product having a shape with a high level of difficulty in grasping or a product having a barcode a size of which is larger than that of the product, the checkout time required to set the first grasped area GA1 may increase.

Accordingly, the processor 120 may calculate the product checkout difficulty information by raising the product checkout difficulty indicated in the product checkout difficulty information, as the checkout time required to set the first grasped area GA1 increases.

Finally, the processor 120 may calculate by increasing the fee of the product, as the product checkout difficulty indicated in the product checkout difficulty information is higher.

In this case, the fee may refer to a cost of scanning the barcode of the product and calculating the price of the product on behalf of the employee by the product checkout system 100 using automatic barcode scanning according to another embodiment of the present invention.

Meanwhile, the fee mentioned above may be charged to a store owner who operates the store, not the customer of the store.

Meanwhile, the product checkout system 100 using automatic barcode scanning according to another embodiment of the present invention may further comprise a scanning unit that is included in the robot arm unit 130 so that the robot arm unit 130 scans the barcode B of the product.

Specifically, the scanning unit that scans the barcode B provided on one side of the product may be disposed on one side of the grasping unit 132 included in the robot arm unit 130. The scanning function of the scanning unit is the same as that of the barcode scanning device 200.

The processor 120 may scan the barcode B not by grasping and moving the product through the grasping unit 132 of the robot arm unit 130 and but by controlling operation of the robot arm unit 130 by approaching the scanning unit to a portion of the product corresponding to the barcode area BA.

Accordingly, the product checkout system 100 using automatic barcode scanning according to another embodiment of the present invention can reduce a time required to grasp the product and move it to the barcode scanning device 200 and can quickly perform product checkout by scanning the barcode B directly from the product in a state of being arranged on the counter C.

As above, the present invention has been described with reference to desirable embodiments. One who has general knowledge in the technical field to which the present invention belongs may understand that the present invention may be embodied in a modified form in scopes that are not deviated from essential characteristics of the present invention. Therefore, disclosed embodiments should be considered from a described point of view, not a limited point of view. The scopes of the present invention are not described above but in the appended claims, and it should be construed that all differences within scopes same as the claim are included in the present invention.

As above, although the present invention has been described in conjunction with limited embodiments and drawings, the present invention is not limited thereto. The present invention may be modified and changed by one who has general knowledge in the technical field to which the present invention belongs, within technical ideas of the present invention and the scopes equivalent to the claim.

DESCRIPTION OF REFERENCE NUMBERS

100: Product checkout system using automatic barcode automatic scanning
110: imaging unit
120: processor
130: robot arm unit
200: barcode scanning device

What is claimed is:

1. A product checkout system using automatic barcode scanning, the product checkout system comprising:
an imaging unit photographing a product and generating a product image;
a processor recognizing a barcode position of a barcode that is provided on one side of the product and includes price information of the product, based on the product image, the processor being configured to recognize the barcode position using an artificial intelligence model wherein the processor trains the artificial intelligence model by using various goods images previously captured and barcode positions recognized from the goods images as learning data, inputs the product image in the artificial intelligence model as input data, and recognizes the barcode position of the product; and
a robot arm unit grasping and moving the product to a barcode scanning device so that the barcode is scanned,
wherein the processor calculates a fee for performing product checkout of the product by scanning the barcode of the product based on one or more of product checkout difficulty information corresponding to the product,
wherein the processor recognizes a shape of the product based on the product image and sets an area of the product that can be structurally grasped by the robot arm unit as a graspable area; sets the barcode position sensed or recognized based on the product image as a barcode area; and sets an area excluding the barcode area from the graspable area as a first grasped area,
wherein the product checkout difficulty information is calculated based on a time required to set the first grasped area,
wherein the robot arm unit grasps a portion of the product corresponding to the first grasped area and moves the product to the barcode scanning device,
wherein the robot arm unit moves the product so that a portion of the product corresponding to the barcode area of the barcode position faces the barcode scanning device,
wherein, if the barcode position is neither recognized from the artificial intelligence model nor not-sensed, the processor sets a second grasped area which can be grasped by the robot arm unit in order to change an arrangement state of the product so that the barcode is exposed to an outside; the robot arm unit grasps a portion of the product corresponding to the second grasped area and changes the arrangement state of the product; and the processor re-sets the first grasped area and controls the robot arm unit so that the portion of the product corresponding to the first grasped area is grasped by the robot arm unit and the product is moved to the barcode scanning device.

* * * * *